United States Patent Office 3,337,360
Patented Aug. 22, 1967

3,337,360
PIGMENT DISPERSIONS FOR COLORING
VISCOSE SPINNING MASSES
Viktor Schönbach, Josef Weissert, and Wolfgang Teige, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 21, 1964, Ser. No. 361,593
Claims priority, application Germany, May 2, 1963, F 39,635
6 Claims. (Cl. 106—308)

In the coloration of regenerated cellulose by the addition of pigment dyestuffs to the viscose spinning mass, the pigments can be used in a very fine dispersion only. For preparing such fine pigment dispersions, dispersing agents have usually been used. The most various classes of dispersing agents have been proposed for this purpose; however, the problem involved has not been solved in a manner such that all requirements of the practice would have been met.

The known cationic dispersing agents, for example, the dispersing agents of the hydroxyethylated fatty amines type such as those described in Belgian Patent 533,832 permit obtaining dispersions having a high degree of distribution of a number of pigments; however, these cationic auxiliaries have the disadvantage that upon addition of the pigment dispersion to the viscose strongly foaming spinning doughs are formed which, even when applying a vacuum, tend to the formation of bubbles during spinning which deteriorate the quality of the spun fiber. A number of pigments can also be easily dispersed with the aid of anionic dispersing agents; these auxiliaries, however, have the disadvantage of causing precipitations in combination dyeings with pigment dispersions based on cationic auxiliaries, which are due to the incompatibility of the different auxiliaries. In practice, such combination dyeings using pigment dispersions prepared in different manner are often used for shading, for example, in the production of fashion dyeings.

During spinning of pigment-colored viscose using the usual dispersing agents, there often form agglomerations, even with very finely dispersed pigments, which eventually clog the holes of the nozzle. These disturbances of the spinning process occur even with the finest dispersions of the pigments in aqueous suspension, if the dispersing agents used do not have the property of preventing the formation of such agglomerations.

Owing to the above reasons, it has hitherto not been possible to prepare, with one dispersing agent, a whole range of spinning dyestuffs which meet all requirements of practice with regard to spinning technique and which give optimum results with regard to color. Besides a failure-free spinning operation, it is required in practice that the filament or foil be obtained free from even the finest bubbles and with constant titer and smoothness. Furthermore, the color intensity and the brilliancy must remain absolutely constant, even during prolonged spinning operation, which is possible only if no dyestuff agglomerations occur neither within nor at the exterior of the nozzle.

The present invention provides pigment dispersions for the spin-dyeing of fibers and foils from regenerated cellulose.

We have found that valuable pigment dispersions which meet the requirements of practice are obtained when using as the dispersing agent for the preparation of the dispersions a condensation product obtained by incorporating by condensation a hydrosoluble addition product of about 8–25 mols of alkylene oxide and 1 mol of an aromatic amine in a phenol and formaldehyde. If desired, the condensation product may be used together with a methylated hydroxyethylated triethanolamine.

The dispersing agents used in accordance with the present invention can be prepared by heating a water-free or a water-containing mixture of the three components, while stirring and cooling under reflux to temperatures in the range of about 70 and 150° C., after addition of an acid catalyst, for example, a strong mineral or organic acid, until the formed reaction product is clearly soluble in water. The heating time required depends on the temperature used and on the starting components. Generally, heating for half an hour up to several hours, about 3, is sufficient. For preparing the mixture of the three starting components, it is advantageous first to melt the addition product of alkylene oxide by slight heating, then to add, while stirring, in any desired order, formaldehyde, for example, in the form of a 30–40% solution or paraformaldehyde, and the phenol, and to add to the mixture the acid catalyst. It is also possible first to precondensate in known manner the phenol and the formaldehyde in a separate reaction and to react the precondensation product with the alkylene oxide addition compound in the manner described above using the acid catalyst. After completion of the reaction, the reaction mixture is rendered neutral, whereupon the condensation product separates in the form of a concentrated, generally 40–60%, aqueous solution from the salt lye formed. If desired, the concentrated solution of the condensation product can be used directly.

In order to improve the resistance against oxidizing influences, the condensation product may additionally be alkylated. The alkylation is effected in known manner, for example, by reacting the condensation product in an aqueous alkaline solution at about 40–70° C. and at pH-values in the range of about 8–12 with the known alkylating agents, for example, dimethyl sulfate or diethyl sulfate.

As dispersing agents which may be used in accordance with the present invention, there may be mentioned in the first instance products derived from addition compounds of 8–25 mols of alkylene oxide, for example, ethylene oxide or propylene oxide, preferably 12–18 mols of ethylene oxide, and 1 mol of a benzaromatic amine, for example, aniline, toluidine, or β-naphthylamine, preferably aniline, and which have been reacted with about 0.5–2 mols, preferably 1 mol, of a phenol such, for example, as phenol, cresol, butylphenol, α-naphthol, β-naphthol or resorcinol, preferably phenol, and about 1–4 mols, preferably 1–2 mols, of formaldehyde. The mentioned molecular proportions may be higher or lower, provided that water-soluble products are formed.

For preparing the pigment dispersions, the dyestuff in the form of an aqueous neutral press cake or of a dry powder with addition of preferably softened water and the dispersing agent of the invention are treated in a suitable kneading or grinding device until the dyestuff is homogeneously distributed. It is without difficulty possible to obtain particle sizes of about 1μ. The necessary grinding time can vary within wide limits depending on the hardness of the grains of the pigment dyestuff. When using a roller mill, it may amount to about 150–300 hours. It is also possible with special advantage to use continuously operating grinding devices, for example, a sand mill. In this case, the grinding time is considerably shorter.

The quantity of dispersing agent added to the dyestuff depends, among others, on the pigment dyestuff used in each individual case. Thus, it must be determined for each individual case and must so be chosen that, on the one hand, there is formed a sufficiently fine, stable dispersion of the pigment and, on the other hand, that no disturbance of the spinning operation occurs or that the optimum color intensity is not impaired by too high a content of dispersing agent. In general, about 0.5–1 part by weight of dispersing agent is used per 1 part by weight of pigment dyestuff. For most of the pigments, a weight ratio of 57–62% of dyestuff to 43–38% of dispersing agent has proved particularly advantageous.

As pigments, there may be used all pigment dyestuffs which are suitable for the spin-dyeing of viscose. There are mentioned, for example, carbon black and the known organic pigments such as azo-pigments, insoluble quinoid and indigoid vat dyestuffs, phthalocyanine dyestuffs, bisoxazine dyestuffs, perylene-tetracarboxylic acid dyestuffs, and quinacridone dyestuffs such as those described, for example, in U.S. Patents 2,844,484, 2,844,581 and 2,844,485. Under azo-pigments, there are to be understood insoluble azo-dyestuffs obtained by coupling diazo- or tetrazo-compounds of amines without hydrosolubilizing groups with the coupling components usual in pigment chemistry. As coupling components, there may be mentioned, for example, naphthols, hydroxynaphthoic acid arylides, pyrazolones, acetoacetic acid arylides, and similar compounds. If these dyestuffs contain sulfonic acid groups or carboxylic acid groups, they may be used in the form of colour lakes prepared with alkaline earth metal salts.

The pigment dispersions of the present invention are distinguished by a good stability of their fine dispersion which is maintained also at elevated temperatures of up to 70° C. as well as at freezing temperatures of down to −20° C., so that after thawing of an eventually frozen pigment dough the fine distribution and the intensity of the color are not deteriorated. The use of the above dispersing agents is particularly advantageous in spinning viscose. The pigment dispersions prepared according to the invention have an unexpected low tendency to foaming and thus allow the preparation of fibers and foils which are practically free from undesired air bubbles. The spinning masses prepared with the dispersing agents of the invention do not tend to clog the spinning nozzle, even not after a several hours spinning. In many cases, the pressure at the spinning nozzle drops when spinning for a prolonged period of time. An important advantage of the dispersing agents of the invention is also that they permit the preparation of a whole assortment of spinning dyestuffs without having to take into account the hardness of the grains and the constitution of the dyestuff to be used.

The following examples illustrate the invention, but they are not intended to limit it thereto:

EXAMPLE 1

A porcelain ball mill having a capacity of 5 liters and provided with 4 kg. of grinding balls of about 12 mm. diameter was charged with 180 g. of dry pulverulent dyestuff, prepared by coupling diazotized 3-nitro-4 - aminotoluene with acetoacetic anilide,
720 g. of a 25% press cake of the same dyestuff,
533 g. of a 45% aqueous solution of the dispersing agent the preparation of which is described hereinafter, and
366 g. of water which was practically free from hardness-causing substances, with an addition of 1 g. of pentachlorophenol sodium.

This mixture was ground until a sample of the pigment dough, diluted in a ratio of 1:30, showed in the microscope a homogeneous fine distribution (particle size $1\mu$ and less). The time of grinding required was about 200 hours. The pigment dough was in this form fluid, weakly foaming and stable in its fine distribution as well as compatible with pigment preparations based on other dispersing agents. A viscose colored therewith showed excellent spin-technical properties and was found to meet all requirements of practice such as constancy of titer, smoothness of filament, brilliancy of dyeing and disturbance-free course of the spinning during several hours.

*Preparation of the dispersing agent*

A mixture of 213 g. of the addition product of 616 g. of ethylene oxide and 93 g. of aniline,
28.2 g. of phenol, and
60 g. of a 30% aqueous formaldehyde solution, was stirred for 50 minutes at 100–105° C., under exclusion of the air, after addition of 40 cc. of sulfuric acid having a strength of 64%. The reaction mixture was diluted with water and adjusted to pH 9 by means of a 33% sodium hydroxide solution. Then, the reaction mixture was methylated in known manner at pH-values of between 9 and 10 and at 50–60° C. by the addition of 91 g. of dimethyl sulfate. After completion of the reaction, a concentrated aqueous solution of the methylated condensation product separated from the salt lye. The concentrated solution of the condensation product was then diluted with water to contain 45 percent by weight of solid matter.

EXAMPLE 2

In a porcelain ball mill having a capacity of 5 liters and provided with 4 kg. of grinding balls of a diameter of about 12 mm., there were ground 360 g. of a dry coupling product of diazotized 2,5-dichloroaniline and 2,5-dimethoxy anilide of naphthoic acid,
533 g. of a 45% aqueous solution of the dispersing agent described in Example 1, and
960 g. of condensed water, with the addition of 1 g. of pentachlorophenol sodium, until a sample of the pigment dough, diluted to 1:30, showed the fine distribution mentioned in Example 1. The necessary grinding time was about 300 hours. The pigment dough so obtained showed the same favourable properties as the dough obtained according to Example 1.

If no condensed water is available but hard water only, it is advantageous to add a complex former, for example, the sodium salt of ethylenediaminotetracetic acid or triethanolamine.

EXAMPLE 3

In a porcelain ball mill having a capacity of 25 l. and provided with about 12 kg. of grinding balls having a diameter of about 20 mm., there were ground 1800 g. of a dry coupling product of diazotized 2,4-dichloroaniline and the o-toluidide of β-oxynaphthoic acid,
2665 g. of a 45% aqueous solution of the dispersing agent described in Example 1, and
4530 g. of condensation water with the addition of 5 g. of pentachlorophenol sodium, until a sample, diluted to 1:30, showed the fine distribution mentioned in Example 1. A grinding time of about 350 hours was necessary. The spinning dough obtained showed the same good properties as the product obtained according to Example 1.

EXAMPLE 4

In a porcelain ball mill having a capacity of 25 l., there were ground, after having introduced 15 kg. of grinding balls of a diameter of about 20 mm., 1800 g. of copper phthalocyanine,
2665 g. of a 45% aqueous solution of the dispersing agent described in Example 1, and
4530 g. of condensation water to which had been added 5 g. of pentachlorophenol sodium, until a sample of the pigment dough, diluted to 1:30, showed the fine distribution mentioned in Example 1.

The grinding time was about 250 hours. A viscose spinning dough colored with this pigment dispersion showed the same good properties as the doughs obtained according to Example 1.

We claim:

1. An aqueous pigment dispersion suitable for coloring viscose spinning masses consisting essentially of (a) about 1 part by weight of a pigment and (b) as the dispersing medium for the pigment, about 0.5 to 1 part by weight of a reaction product of: (i) a water-soluble addition product of 8 to 25 moles of low molecular weight alkylene oxide and one mole of benzaromatic amine; (ii) 0.5 to 2 moles of a phenol; and (iii) 1 to 4 moles of formaldehyde.

2. An aqueous pigment dispersion suitable for coloring viscose spinning masses consisting essentially of a pigment and, as the dispersing medium for the pigment, an alkylated reaction product of (a) a water-soluble addition product of 8 to 25 moles of a low molecular weight alkylene oxide and one mole of a benzaromatic amine; (b) 0.5 to 2 moles of a phenol; and (c) 1 to 4 moles of formaldehyde, the relative proportion of said pigment to the dispersing medium being in a ratio of 1 to 0.5–1 in parts by weight.

3. An aqueous pigment dispersion suitable for coloring viscose spinning masses consisting essentially of a pigment and as a dispersing medium for the pigment 0.5 to 1 part by weight per one part of the pigment a reactiton product of (a) water-soluble addition product of 8 to 25 moles of a low molecular weight alkylene oxide and one mole of a benzaromatic amine; (b) 0.5 to 2 moles of a phenol; and (c) 1 to 4 moles of formaldehyde.

4. An aqueous pigment dispersion suitable for coloring viscose spinning masses consisting essentially of a pigment and as a dispersing medium for the pigment 0.5 to one part by weight per one part of the pigment an alkylated reaction product of (a) water-soluble addition product of 8 to 25 moles of a low molecular weight alkylene oxide and one mole of a benzaromatic amine; (b) 0.5 to 2 moles of a phenol; and (c) 1 to 4 moles of formaldehyde, wherein the reaction product is a low molecular weight dialkyl sulfate alkylation product.

5. An aqueous pigment dispersion suitable for coloring viscose spinning masses consisting essentially of a pigment and as a dispersing medium for the pigment 0.5 to 1 part by weight per one part of the pigment a reaction product of (a) a water soluble addition product of 8 to 25 moles of a low molecular weight alkylene oxide and one mole of a benzaromatic amine selected from the class consisting of aniline, toluidine, and $\beta$-naphthylamine; (b) 0.5 to 2 moles of a phenol selected from the class consisting of phenol, cresol, butylphenol, naphthol, and resorcinol; and (c) 1 to 4 moles of formaldehyde.

6. A pigment dispersion according to claim 2 wherein the alkylated product is an alkylation product of a low molecular weight dialkyl sulfate alkylating agent.

References Cited

UNITED STATES PATENTS 3,094,499   6/1963   Gassmann et al. _____ 106—308

TOBIAS E. LEVOW, *Primary Examiner.*

HELEN M. McCARTHY, J. E. POER, *Examiners.*